US010364529B2

(12) United States Patent
Calvet et al.

(10) Patent No.: US 10,364,529 B2
(45) Date of Patent: Jul. 30, 2019

(54) SPLITTING METHOD

(71) Applicants:COMPAGNIE GENERALE DES ETABLISSEMENTS MICHELIN, Clermont-Ferrand (FR); Michelin Recherche et Technique S.A., Granges-Paccot (CH)

(72) Inventors: Marc Calvet, Clermont-Ferrand (FR); Henri Barguet, Clermont-Ferrand (FR); Francis Aubarede, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 215 days.

(21) Appl. No.: 15/524,716

(22) PCT Filed: Nov. 20, 2015

(86) PCT No.: PCT/EP2015/077255
§ 371 (c)(1),
(2) Date: May 5, 2017

(87) PCT Pub. No.: WO2016/083265
PCT Pub. Date: Jun. 2, 2016

(65) Prior Publication Data
US 2017/0321376 A1    Nov. 9, 2017

(30) Foreign Application Priority Data

Nov. 25, 2014    (FR) ..................................... 14 61395

(51) Int. Cl.
*D07B 5/00* (2006.01)
*D02G 3/48* (2006.01)
(Continued)

(52) U.S. Cl.
CPC ............ *D07B 5/007* (2013.01); *B60C 9/0007* (2013.01); *D02G 3/48* (2013.01); *D07B 1/0626* (2013.01);
(Continued)

(58) Field of Classification Search
CPC .... D07B 5/007; D07B 1/0626; D07B 1/0646; D07B 1/12; D07B 1/0613; D07B 7/025;
(Continued)

(56) References Cited

U.S. PATENT DOCUMENTS 838,899 A  *  12/1906  Quambusch ............. D04C 3/48
                                                    87/34
861,703 A  *   7/1907  Blakesley ................ D04C 3/48
                                                    87/34
(Continued)

FOREIGN PATENT DOCUMENTS

DE      1 510 149       8/1970
DE    196 38 984 A1     4/1998
(Continued)

OTHER PUBLICATIONS

Feb. 12, 2016 International Search Report and Written Opinion in International Patent Appln. No. PCT/EP2015/077255.

*Primary Examiner* — Alissa J Tompkins
*Assistant Examiner* — Dakota Marin
(74) *Attorney, Agent, or Firm* — Venable LLP

(57) ABSTRACT

A method is provided for manufacturing at least first and second assemblies of M1 filamentary elements and M2 filamentary elements. At least one of the first and second assemblies includes a plurality of filamentary elements wound together in a helix. The method includes a step of assembling M filamentary elements together into a layer of the M filamentary elements around a temporary core, to form a temporary assembly. The method also includes a step (Continued)

of splitting the temporary assembly into at least the first and second assemblies of M1 filamentary elements and M2 filamentary elements.

16 Claims, 6 Drawing Sheets

(51) Int. Cl.
| | |
|---|---|
| *D07B 1/06* | (2006.01) |
| *D07B 7/02* | (2006.01) |
| *B60C 9/00* | (2006.01) |
| *D07B 1/12* | (2006.01) |
| *D07B 3/00* | (2006.01) |

(52) U.S. Cl.
 CPC ............. *D07B 1/0646* (2013.01); *D07B 1/12* (2013.01); *D07B 7/025* (2013.01); *B60C 2009/0078* (2013.01); *B60C 2009/0085* (2013.01); *B60C 2009/0092* (2013.01); *D07B 1/0613* (2013.01); *D07B 3/00* (2013.01); *D07B 2201/2007* (2013.01); *D07B 2201/2021* (2013.01); *D07B 2201/2035* (2013.01); *D07B 2205/3021* (2013.01); *D07B 2207/204* (2013.01); *D07B 2207/4018* (2013.01); *D07B 2207/4072* (2013.01); *D07B 2401/201* (2013.01); *D07B 2401/406* (2013.01); *D07B 2501/2046* (2013.01)

(58) Field of Classification Search
 CPC ............. D07B 3/00; D07B 2201/2007; D07B 2201/2021; D07B 2201/2035; D07B 2205/3021; D07B 2207/204; D07B 2207/4018; D07B 2207/4072; D07B 2401/201; D07B 2401/406; D07B 2501/2046; B60C 9/0007; B60C 2009/0078; B60C 2009/0085; B60C 2009/0092; D02G 3/48; D02G 3/38
 USPC .................................. 57/210, 2.3, 2.5; 87/34
 See application file for complete search history.

(56) References Cited

U.S. PATENT DOCUMENTS

| | | | | | |
|---|---|---|---|---|---|
| 3,444,684 | A | * | 5/1969 | Schoerner | D07B 5/007 57/15 |
| 5,487,262 | A | * | 1/1996 | De Waegenaere | D07B 3/10 57/1 UN |
| 5,533,327 | A | | 7/1996 | Albert | 57/311 |
| 5,661,966 | A | * | 9/1997 | Matsumaru | B60C 9/0007 57/206 |
| 5,784,874 | A | * | 7/1998 | Bruyneel | D07B 1/0613 57/237 |
| 6,076,344 | A | * | 6/2000 | Doujak | D07B 1/0646 57/9 |
| 6,151,879 | A | * | 11/2000 | Doujak | D07B 1/0606 57/311 |
| 6,412,263 | B1 | * | 7/2002 | Lee | D07B 1/0613 57/204 |
| 8,468,689 | B2 | * | 6/2013 | Spruell | H01B 13/0228 29/825 |
| 2006/0237110 | A1 | | 10/2006 | Barguet et al. | 152/451 |
| 2009/0294009 | A1 | | 12/2009 | Barguet et al. | 152/527 |
| 2015/0136295 | A1 | | 5/2015 | Barguet et al. | B60C 9/0007 |
| 2015/0159325 | A1 | | 6/2015 | Barguet et al. | D07B 5/12 |
| 2017/0321352 | A1 | | 11/2017 | Calvet et al. | |

FOREIGN PATENT DOCUMENTS

| | | |
|---|---|---|
| EP | 0 143 767 A1 | 6/1985 |
| EP | 0 548 539 A2 | 6/1993 |
| EP | 0 622 489 A1 | 11/1994 |
| EP | 1 000 194 A1 | 5/2000 |
| FR | 2 897 076 A1 | 8/2007 |
| JP | H02-269885 A | 11/1990 |
| JP | H09-158069 A | 6/1997 |
| JP | 2002-266264 A | 9/2002 |
| JP | 2010-179773 A | 8/2010 |
| JP | 2010-264878 A | 11/2010 |
| WO | WO 97/12092 A1 | 4/1997 |

* cited by examiner

US 10,364,529 B2

SPLITTING METHOD

FIELD OF THE INVENTION

The invention relates to a method for the manufacture of at least first and second assemblies of M1 filamentary elements and M2 filamentary elements, to an assembly of filamentary elements, and to a tire comprising such an assembly.

RELATED ART

A tire for a heavy vehicle with a radial carcass reinforcement is known from the prior art. Such a tire comprises a radial carcass reinforcement anchored in two beads and surmounted radially by a crown reinforcement itself surmounted by a tread which is connected to the beads by two sidewalls.

In such a tire, the crown reinforcement comprises a working reinforcement, a hoop reinforcement, a protective reinforcement and, optionally, a triangulation reinforcement. The relative arrangement of these reinforcements with respect to one another may vary. In general, the protective reinforcement is the radially outermost reinforcement, and the working reinforcement is the radially innermost reinforcement, the hoop reinforcement being arranged between the protective reinforcement and the working reinforcement.

Each reinforcement comprises a single ply or several plies. Each ply comprises reinforcing elements arranged side by side parallel to one another. The reinforcing elements make an angle that varies according to the reinforcement to which the ply belongs. Each reinforcing element comprises one or more assemblies of filamentary elements, each assembly comprising several individual metallic threads assembled with one another either by cabling or by twisting.

An assembly of filamentary elements comprising a single layer of filamentary elements, in this instance, three threads, of diameter 0.26 mm wound together in a helix with a pitch of 5 mm is known from the prior art. This assembly is referred to as a "3.26" assembly according to standard terminology.

In order to ensure that each reinforcement works correctly, particularly the hooping and protective reinforcements, it is desirable to be able to control the structural elongation of these assemblies of filamentary elements, and more particularly to be able to obtain a high structural elongation where that is necessary. The use of a conventional twisting method makes it possible to obtain a structural elongation at most equal to 0.5% for the 3.26 cord described hereinabove.

In order to increase the value of the structural elongation, the prior art knows various methods and installations for the manufacture of an assembly of threads comprising a single layer of several threads wound together in a helix. Such methods and facilities are described in documents EP0548539, EP1000194, EP0622489 or even EP0143767. In these methods, in order to obtain the highest possible structural elongation, the threads are preformed. However, this step of preforming threads, which requires a special facility on the one hand, makes the method relatively unproductive in comparison with a method that has no preforming step, without in the process making it possible to obtain high structural elongations and, what is more, it impairs the threads thus preformed because of the friction with the preforming tools. Specifically, the use of an assembly process employing a step of preforming the threads makes it possible to obtain a structural elongation at most equal to 2.0% for the 3.26 cord described hereinabove.

BRIEF DESCRIPTION OF EMBODIMENTS OF THE INVENTION

It is an object of the invention to control the structural elongation of assemblies of filamentary elements and in particular to be able to achieve a high structural elongation where that is necessary without necessarily having to use a preforming step.

To this end, one subject of the invention is a method for the manufacture of at least first and second assemblies of M1 filamentary elements and M2 filamentary elements, at least one of the first and second assemblies comprising several filamentary elements wound together in a helix, the method comprising:
 a step of assembling M filamentary elements together into a layer of the M filamentary elements around a temporary core to form a temporary assembly, and
 a step of splitting the temporary assembly into at least the first and second assemblies of M1 filamentary elements and M2 filamentary elements.

By virtue of the method according to the invention it is possible to control the structural elongation of the assemblies obtained and, if that is necessary, to obtain a relatively high structural elongation and to do so without having to use a preforming step.

Specifically, during the step of assembling the temporary assembly, the M filamentary elements are given a curvature which they maintain during and after the splitting step. Now, during the step of splitting of this temporary assembly, because the temporary core is split between the first and second assemblies of filamentary elements or is separated from the first and second assemblies of filamentary elements, the assembly or assemblies obtained are very open because of the reduction or elimination of the diameter of the temporary core and because the filamentary elements maintain their curvature. This openness makes it possible to obtain assemblies that exhibit high structural elongation if that is necessary.

By virtue of the method according to the invention the first and second assemblies of M1 filamentary elements and M2 filamentary elements are manufactured simultaneously.

Each first and second assembly is a single-helix assembly. By definition, a single-helix assembly is an assembly in which the axis of each filamentary element describes a single helix, as opposed to a double-helix assembly in which the axis of each filamentary element describes a first helix about the axis of the assembly and a second helix about a helix described by the axis of the assembly.

In other words, when the assembly extends in a substantially rectilinear direction, each assembly comprising one or more layers of filamentary elements wound together in a helix, each filamentary element of the layer describes a path in the form of a helix about the substantially rectilinear direction so that the distance between the center of each filamentary element of a given layer and the axis of the substantially rectilinear direction is substantially constant and equal for all the filamentary elements of the given layer. By contrast, when a double-helix assembly extends in a substantially rectilinear direction, the distance between the center of each filamentary element of a given layer and the substantially rectilinear direction is different for all the filamentary elements of the given layer.

What is meant by a filamentary element is any longilinear element the length of which is great in relation to its cross-section, whatever the shape of the latter, for example circular, oblong, rectangular, or square, or even flat, this filamentary element being able, for example, to be twisted or corrugated. When it is circular in shape, its diameter is preferably less than 3 mm.

In one embodiment, each filamentary element comprises a single elementary monofilament.

In another embodiment, each filamentary element comprises an assembly of several elementary monofilaments. Thus, for example, each filamentary element comprises a strand of several elementary monofilaments. Each strand preferably comprises one or more layers of elementary monofilaments wound together in a helix.

In these two embodiments, each elementary monofilament is preferably metallic. What is meant by definition by metallic is an elementary monofilament consisting predominantly (which means to say in respect of more than 50% of its mass) or wholly (in respect of 100% of its mass) of a metallic material. Each elementary monofilament is preferably made of steel, more preferably made of perlitic (or ferrito-perlitic) carbon steel denoted hereinafter as "carbon steel" or alternatively of stainless steel (which by definition is steel containing at least 10.5% chromium).

When a carbon steel is used, its carbon content (% by mass of steel) is preferably comprised between 0.5% and 0.9%. Use is preferably made of a steel of the normal tensile (NT) steel cord or high tensile (HT) steel cord type with a tensile strength (Rm) preferably greater than 2000 MPa, more preferably greater than 2500 MPa and less than 3500 MPa (measures taken under tensile testing in accordance with standard ISO 6892-1 of 2009).

In one preferred embodiment, the or each elementary monofilament has a diameter ranging from 0.05 mm to 0.50 mm, preferably from 0.10 mm to 0.40 mm and more preferably from 0.15 mm to 0.35 mm.

In a first embodiment, the step of splitting the temporary assembly comprises a step of separating the temporary core from the first and second assemblies.

Thus, in this first embodiment, there are obtained two assemblies of filamentary elements each comprising a layer respectively of the M1, M2 filamentary elements wound together in a helix. Each assembly of filamentary elements has no center wire. In this embodiment, the first assembly is made up of M1 filamentary elements wound together and distributed in a single layer about the axis of the first assembly. Similarly, the second assembly in this embodiment is made up of M2 filamentary elements wound together and distributed in a single layer about the axis of the second assembly. These are also referred to as assemblies of 1×M1 and 1×M2 structure or even assemblies of the open-cord structure.

In other words, in this first embodiment, with the temporary core comprising at least one thread, each thread of the temporary core does not belong to the first and second assemblies of M1 filamentary elements and M2 filamentary elements. Therefore M1+M2=M.

In a preferred first alternative form of this first embodiment, during the splitting step, the first assembly is separated from a temporary collection formed by the second assembly and the temporary core, then the second assembly and the temporary core are separated from one another. Thus, by separating the first assembly first of all from the temporary collection, the temporary core can be extracted more easily from the layer formed by the filamentary elements of the second assembly when the second assembly is separated from the temporary core.

In a second alternative form, during the splitting step, the temporary core, the first assembly and the second assembly are simultaneously separated pairwise from one another.

Advantageously, the method comprises a step of recycling the temporary core, during which:
the temporary core is recovered downstream of the splitting step, and
the temporary core previously recovered is introduced upstream of the assembly step.

Thus, the temporary core is reused.

In a preferred embodiment, the step of recycling the temporary core may be performed continuously, namely in which the temporary core leaving the separation step is reintroduced into the assembly step without a step of intermediate storage of the temporary core.

In another embodiment, the step of recycling the temporary core is discontinuous, which means to say that there is a step of intermediate storage of the temporary core.

More preferably, use is made of a temporary core made of textile. What is meant by textile is that the temporary core is non-metallic. Specifically, the twist-untwist torsion cycle experienced by the temporary core during the assembly and splitting steps creates, when the temporary core is metallic, residual torsion rendering the recycled temporary core less easy to use. When the temporary core is made of textile, it exhibits no residual torsion and can therefore be reused easily.

In one embodiment, the textile temporary core comprises a textile elementary monofilament.

In another embodiment, the textile temporary core comprises one or more textile multifilament strands comprising several textile elementary monofilaments. In an alternative, the temporary core comprises a single multifilament strand referred to as an overtwist comprising several elementary monofilaments. In an alternative form, the temporary core comprises several multifilament strands, each referred to as an overtwist, each comprising several elementary monofilaments and assembled together in a helix so as to form a plied yarn.

Advantageously, the or each textile material of each textile elementary monofilament is selected from a polyester, a polyamide, a polyketone, a polyvinyl alcohol, a cellulose, an inorganic fibre, a natural fibre or a mixture of these materials.

Among polyesters, mention may be made of polyethylene terephthalate (PET), polyethylene naphthalate (PEN), polybutylene terephthalate (PBT), polybutylene naphthalate (PBN), polypropylene terephthalate (PPT) or polypropylene naphthalate (PPN). Among polyamides, mention may be made of an aliphatic polyamide such as nylon or an aromatic polyamide such as aramid. Among polyvinyl alcohols, mention may be made of Kuralon®. Among celluloses, mention may be made of rayon. Among inorganic fibres mention may be made of glass fibre and carbon fibre. Among natural fibres mention may be made of hemp or linen fibres.

In a second embodiment, the step of splitting the temporary assembly comprises a step of splitting the temporary core between at least the first and second assemblies.

Thus, in this second embodiment, two assemblies of filamentary elements are obtained, each comprising a layer respectively of P1, P2 filamentary elements wound together in a helix and, in the case of at least one of the assemblies, a center wire comprising or consisting at least in part of the temporary core around which the filamentary elements of the layer are wound.

In other words, in this second embodiment, with the temporary core comprising N filamentary element(s), at least one of the N filamentary element(s) of the temporary core belongs to at least one of the first and second assemblies of M1 filamentary elements and M2 filamentary elements.

Advantageously, during the splitting step, at least a first part of the temporary core with first filamentary elements is split from the temporary assembly so as to form the first assembly.

Thus, the first assembly comprises a layer of P1 filamentary elements wound together in a helix and a center wire comprising or consisting of a first proportion (N1 filamentary element(s)) of the N filamentary elements of the temporary core and around which the P1 filamentary elements are wound together in a helix. So P1+N1=M1.

Advantageously, during the splitting step, at least a second part of the temporary core with second filamentary elements is split from the temporary assembly so as to form the second assembly.

Thus, the second assembly comprises a layer of P2 filamentary elements wound together in a helix and a center wire comprising or consisting of a second proportion (N2 filamentary element(s)) of the N filamentary elements of the temporary core and around which the P2 filamentary elements are wound together in a helix. So P2+N2=M2.

For preference, the first and second assemblies are formed simultaneously.

For preference, before the splitting step, the first and second parts of the temporary core constitute the temporary core. Thus, the first and second parts of the temporary core complement each other. Therefore N1+N2=N. In an alternative, it might be possible to have N1+N2<N.

In an alternative form, the first assembly comprises a layer of P1 filamentary elements wound together in a helix around a center wire comprising or consisting of the temporary core, and the second assembly comprises a layer of P2=M2 filamentary elements wound together in a helix and without a center wire.

In one embodiment, the assembly step is performed by twisting. In such a case, the threads or strands experience both a collective twist and an individual twist about their own axis, generating an untwisting torque on each of the threads or strands.

In another embodiment, the assembly step is performed using cabling. In that case, the threads or strands do not experience any torsional twist about their own axis, because of the rotation being synchronous before and after the assembly point.

For preference, in the case of a step of assembly using twisting, the method comprises a step of twist-balancing the temporary assembly. Thus, with the twist-balancing step being performed on the assembly made up of the M filamentary elements and of the temporary core, the twist-balancing step is implicitly performed upstream of the splitting step. This avoids the need to manage the residual twist imposed during the assembly step in the path followed by the cord downstream of the assembly step, notably in the guide means, for example the pulleys. Furthermore, the twist-balancing step imposes a curvature on the filamentary elements that is greater than that obtained with a step of assembly by cabling without a preforming step. This greater curvature contributes to the preferred attainment of high structural elongation.

Advantageously, the method comprises a step of twist-balancing at least one of the first and second assemblies after the splitting step.

Advantageously, the method comprises a step of maintaining the rotation of the first and second assemblies about their respective direction of travel. This step is performed after the splitting step and before the step of twist-balancing at least one of the first and second assemblies.

For preference, the method has no steps of individually preforming each of the filamentary elements. In the methods of the prior art that use a step of individually preforming each of the filamentary elements, the latter have a shape imposed on them by preforming tools, for example wheels, these tools creating defects at the surface of the filamentary elements. These defects considerably reduce the endurance of the filamentary elements and therefore of the assembly. Conversely, the method preferably makes it possible to avoid carrying out preforming steps and therefore creating defects. The assembly obtained is therefore far better in terms of endurance than an assembly having the same structural elongation but comprising at least one filamentary element that has been preformed.

Another subject of the invention is a single-helix assembly comprising a layer of several filamentary elements wound together in a helix, characterized in that it has a structural elongation greater than or equal to 2.0% measured in accordance with standard ASTM A931-08 and in that it can be obtained using a method as defined hereinabove.

Advantageously, each filamentary element of the layer exhibits torsion about its own axis of revolution. Such an assembly is manufactured using a method employing a twisting step. Such torsion can be seen by looking at each filamentary element under a microscope.

Advantageously, each filamentary element of the layer exhibits no marks of preforming. Thus, the openness conferred on the cord and therefore the structural elongation thereof are conferred by the method described hereinabove and not by a preforming step, which step would lead to marks being left on each filamentary element. Such marks would be visible by looking at each filamentary element under a microscope.

Advantageously, the assembly of filamentary elements has a structural elongation greater than or equal to 3.0%, preferably 4.0% and more preferably 5.0%, measured in accordance with standard ASTM A931-08.

In one embodiment, the assembly of filamentary elements comprises a single layer of several filamentary elements wound together in a helix and has no center wire. In other words, the assembly is made up of a single layer of several filamentary elements wound together.

In another embodiment, the assembly of filamentary elements comprises a layer of several filamentary elements wound together in a helix and a center wire around which the filamentary elements of the layer are wound together in a helix.

In one embodiment, with the assembly consisting of a single strand, the assembly has a diameter less than or equal to 2.4 mm.

In another embodiment, with the assembly being formed of at least two strands, the assembly has a diameter less than or equal to 6.5 mm.

What is meant by the diameter of the assembly is the diameter of the smallest circle inside which all the filamentary elements of the assembly are inscribed. Such a diameter may be measured by observation using a profile projector.

Another subject of the invention is an assembly of filamentary elements comprising a layer of several filamentary elements wound together in a helix which can be obtained using a method as described hereinabove.

Yet another subject of the invention is a tire comprising an assembly of filamentary elements as defined hereinabove.

Such a tire is notably intended to be fitted to motor vehicles of the passenger car, SUV (Sport Utility Vehicle), two-wheeled (notably bicycle, motorbike), aircraft type and to industrial vehicles chosen from vans, heavy duty vehicles—namely metro, bus, heavy road transport vehicles (trucks, tractors, trailers), off-road vehicles such as agricultural or civil engineering vehicles, or other transport or handling vehicles.

For preference, the tire comprises a tread and a crown reinforcement arranged radially on the inside of the tread. The crown reinforcement preferably comprises a working reinforcement and a protective reinforcement, the protective reinforcement being interposed radially between the tread and the working reinforcement. In a preferred embodiment, each protective ply comprising one or more reinforcing elements, referred to as protective elements, each protective reinforcing element comprises an assembly as described hereinabove.

According to an optional feature of the tire, the protective reinforcing element or elements make an angle at least equal to 10°, preferably ranging from 10° to 35° and more preferably from 15° to 35° with the circumferential direction of the tire.

According to another optional feature of the tire, with each working ply comprising reinforcing elements, referred to as working reinforcing elements, the working reinforcing elements make an angle at most equal to 60°, preferably ranging from 15° to 40°, with the circumferential direction of the tire.

In a preferred embodiment, the crown reinforcement comprises a hoop reinforcement comprising at least one hooping ply. In a preferred embodiment, each hooping ply comprising one or more reinforcing elements referred to as hoop reinforcing elements, each hooping element comprises an assembly as described hereinabove.

According to an optional feature of the tire, the hoop reinforcing element or elements make an angle at most equal to 10°, preferably ranging from 5° to 10°, with the circumferential direction of the tire.

In a preferred embodiment, the carcass reinforcement is arranged radially on the inside of the crown reinforcement. Advantageously, the carcass reinforcement comprises at least one carcass ply comprising reinforcing elements referred to as carcass reinforcing elements, the carcass reinforcing elements making an angle greater than or equal to 65°, preferably greater than or equal to 80°, and more preferably ranging from 80° to 90° with respect to the circumferential direction of the tire.

BRIEF DESCRIPTION OF THE DRAWINGS

The invention will be better understood from reading the description which will follow, which is given solely by way of nonlimiting example and given with reference to the drawings in which.

DETAILED DESCRIPTION OF EMBODIMENTS OF THE INVENTION

Figure 1:
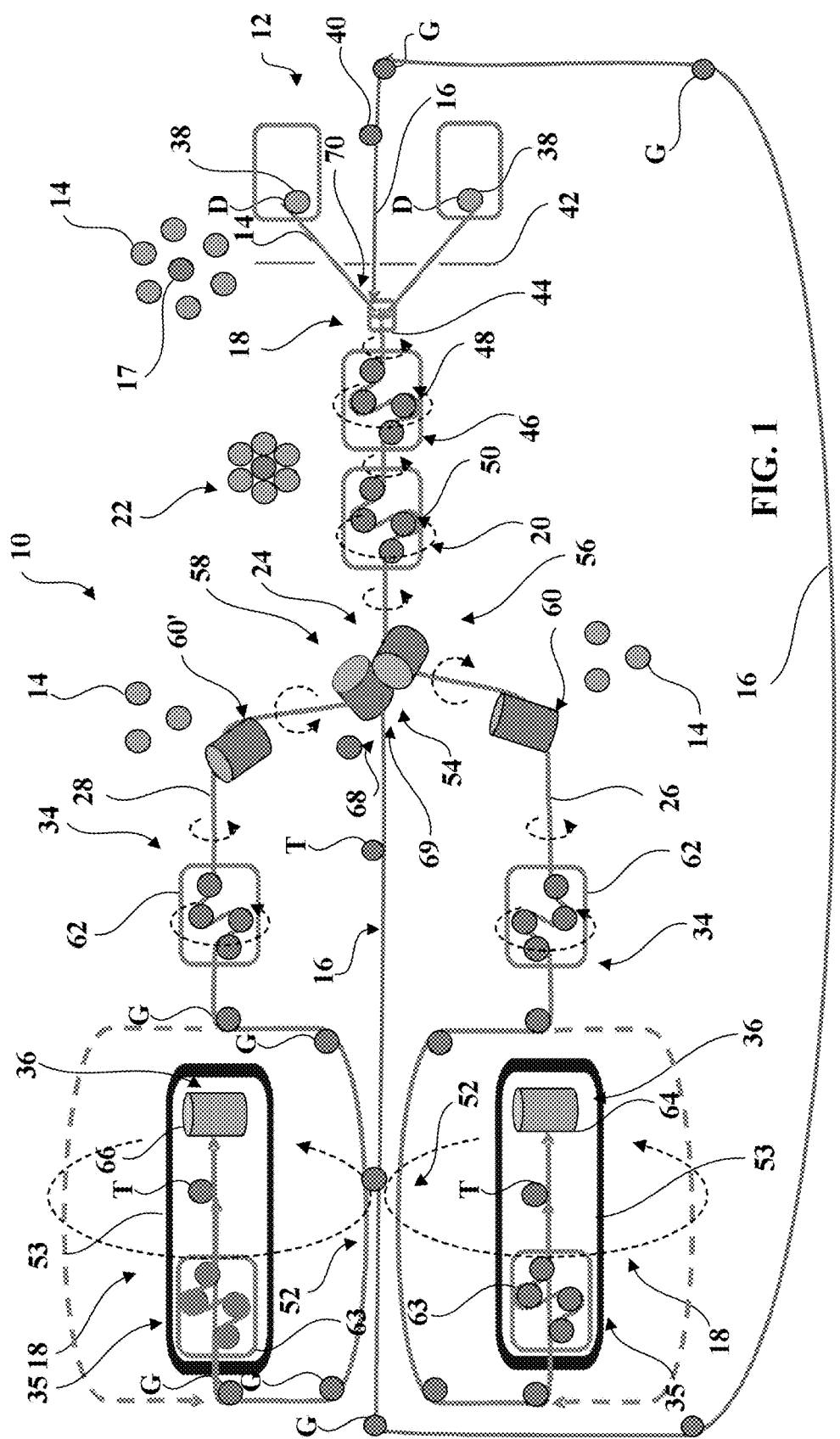
FIG. 1 is a diagram of a facility for implementing a method according to a first embodiment of the invention and for manufacturing the cord of FIG. 5.

FIG. 1 depicts a facility for manufacturing at least first and second assemblies of M1 filamentary elements and M2 filamentary elements. This facility is denoted by the general reference 10.

The facility 10 comprises, from upstream to downstream when considering the direction in which the filamentary elements travel:

means 12 of supplying M filamentary elements 14 and a temporary core 16, means 18 of assembling the M filamentary elements 14 together into a layer of M filamentary elements 14 around a temporary core 16 to form a temporary assembly 22, means 20 of twist-balancing the temporary assembly 22 comprising, in this instance made up of, the M filamentary elements 14 and the temporary core 16, means 24 of splitting the M filamentary elements 14 and the temporary core 16 into at least first and second assemblies 26, 28 of M1 filamentary elements and M2 filamentary elements, means 34 of maintaining the rotation of each first and second assembly 26, 28 about their respective direction of travel, these means being arranged downstream of the splitting means 24, means 35 of twist-balancing at least one of the first and second assemblies 26, 28 which means are arranged downstream of the rotation maintaining means 34, and means 36 of storing the first and second assemblies 26, 28.

The facility 10 also comprises guide means G, paying-out means D and traction means T for guiding, paying out and pulling the filamentary elements and assemblies as conventionally used by those skilled in the art, for example pulleys and capstans.

The supply means 12 here comprise six storage reels 38 for each filamentary element 14 and a storage reel 40 for the temporary core 16. In FIG. 1, only two of the six reels 38 have been depicted in order to maintain the clarity of the figure.

The assembly means 18 comprise a distributor 42 and an assembly guide 44. The assembly means 18 comprise means 46 of twisting the M filamentary elements 14 and the temporary core 16. The twisting means 46 comprise a device 48 also commonly known as a twister to those skilled in the art, for example a four-pulley twister. Downstream of these twisting means 46, the twist-balancing means 20 comprise a twister 50, for example a four-pulley twister. Finally, downstream of the twister 48, the assembly means 18 comprise a bracket 52 and a nacelle 53 bearing the final twist-balancing means 35 and the storage means 36. The bracket 52 and the nacelle 53 are mounted with the ability to rotate so as to maintain the assembly pitch of the assemblies 26, 28.

In this first embodiment, the splitting means 24 comprise means 54 of separating the temporary core 16 from the first and second assemblies 26, 28. These separating means 54 comprise, on the one hand, means 56 of separating the first assembly 26 from a temporary collection 25 formed by the second assembly 28 and the temporary core 16 and, on the other hand, means 58 of separating the second assembly 28 and the temporary core 16 from one another.

Figure 2:
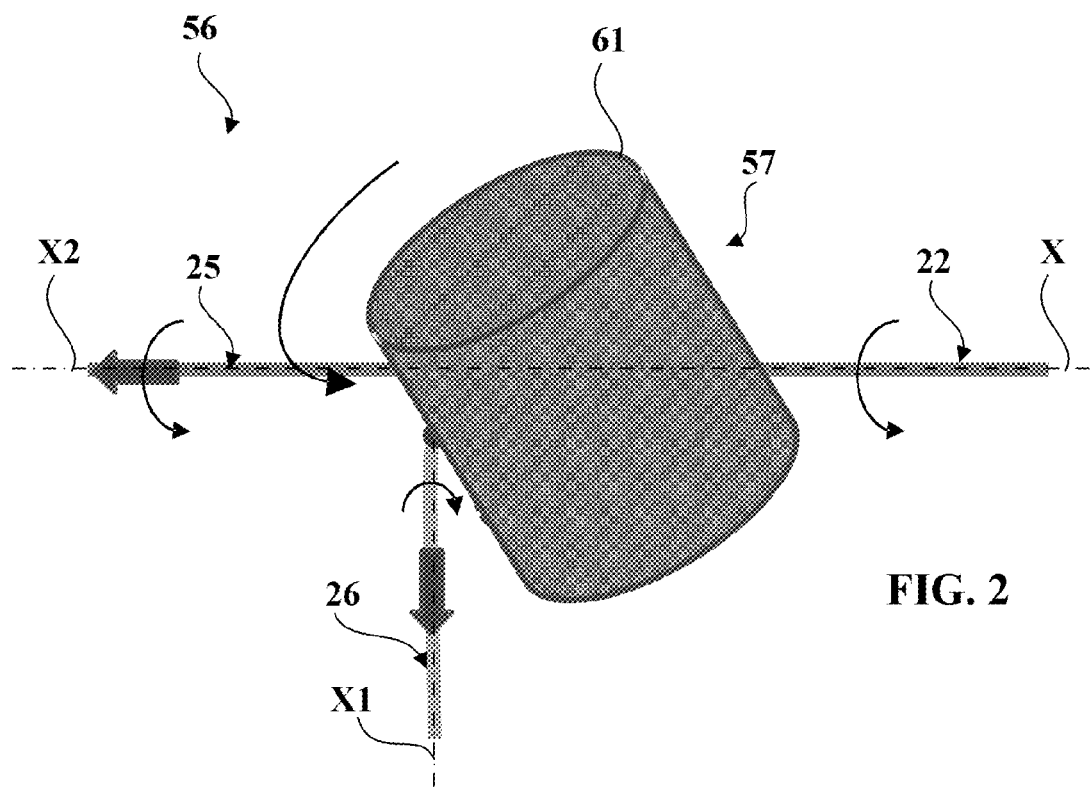
FIGS. 2 and 3 are diagrams of separation means of the facility of FIG. 1.

FIG. 2 depicts the separating means 56. The temporary assembly 22 travels in an upstream direction of travel X. After passing through the separating means 56, the first assembly 26 travels in a downstream direction of travel X1 and the temporary collection 25 travels in a downstream direction X2. The separating means 56 comprise guide means 57 allowing, on the one hand, the translational movement of the first assembly 26 and the temporary collection 25 respectively in the downstream directions X1, X2 and, on the other hand, the rotation of the first assembly 26 and of the temporary collection 25 respectively about the downstream directions X1, X2. In this particular instance, the means 57 comprise an inclined rotary roller 61.

Figure 3:
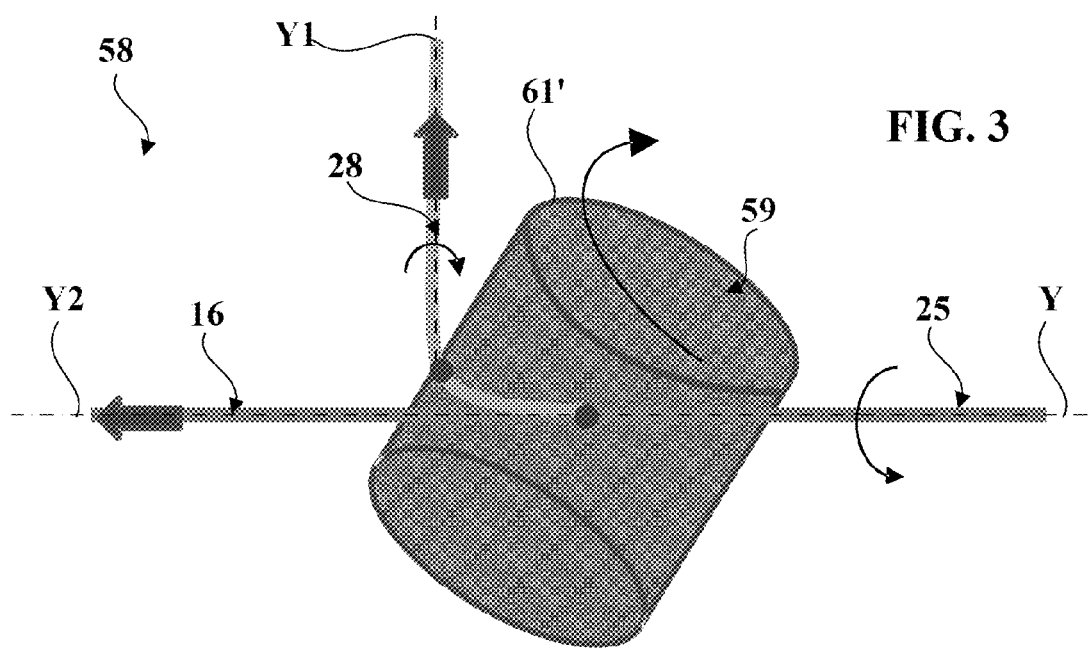

FIG. 3 depicts the separating means 58. The temporary collection 25 travels in an upstream direction of travel Y. After passing through the separating means 58, the second assembly 28 travels in a downstream direction of travel Y1 and the temporary core 16 travels in a downstream direction Y2. The separating means 58 comprise guide means 59 allowing on the one hand the translational movement of the second assembly 28 and of the temporary core 16 in the downstream directions Y1, Y2 respectively and, on the other hand, the rotation of the second assembly 28 and of the temporary core 16 respectively about the downstream directions Y1, Y2. In this particular instance, the means 59 comprise an inclined rotary roller 61'.

A person skilled in the art will know how to determine the inclination of the rollers 61, 61' notably according to the speeds of travel and diameters of the assemblies.

With reference to FIG. 1, the separating means 54 also comprise, downstream of the separating means 56, 58, means 60, 60' of guiding the first and second assemblies 26, 28 respectively. The guide means 60, 60' respectively, in a similar way to the means 57, 59, allow the translational movement of each first and second assembly 26, 28 in its respective downstream direction and the rotation of each first and second assembly 26, 28 about its respective downstream direction. Each guide means 60, 60' comprises an inclined rotary roller similar to the rollers 61, 61'.

The means 34 of maintaining the rotation comprise, for each assembly 26, 28, a twister 62, for example a four-pulley twister making it possible to maintain the rotation of each assembly respectively about the downstream directions X1, Y1.

The final twist-balancing means 35 also comprise, for each assembly 26, 28, a twister 63, for example a four-pulley twister.

The storage means 36 here comprise two storage reels 64, 66 for respectively storing each first and second assembly 26, 28.

In order to recycle the temporary core 16, the facility 10 comprises means 69 of guiding the temporary core 16 between, on the one hand, an outlet 68 of the splitting means 24 and, on the other hand, an inlet 70 into the assembly means 18.

It will be noted that the facility 10 is not provided with preforming means, particularly with means for individually preforming the filamentary elements 14 arranged upstream of the assembly means 18.

Figure 4:
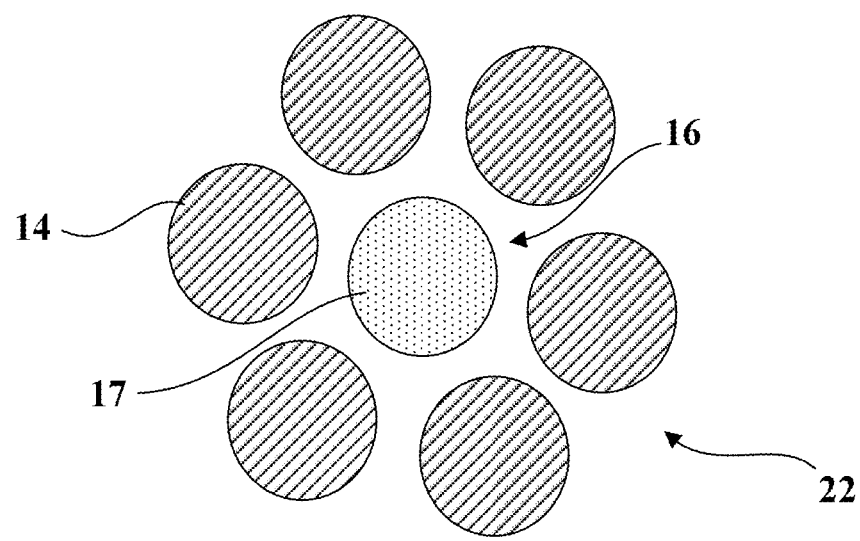
FIG. 4 is a view in section perpendicular to the axis of the assembly (assumed to be rectilinear and at rest) of a first temporary assembly.

FIG. 4 depicts the temporary assembly 22 comprising M filamentary elements wound together in a helix around the temporary core 16 comprising N filamentary element(s) 17. The temporary assembly 22 comprises M=6 filamentary elements 14. The temporary core 16 here comprises a single filamentary element 17 (N=1).

Each filamentary element 14 comprises, in this instance is made up of, a single metallic elementary monofilament of circular cross section, in this instance made of carbon steel, having a diameter of between 0.05 and 0.50 mm, and here equal to 0.26 mm. Each filamentary element 17 comprises several multifilament strands, each referred to as an overtwist, each comprising several elementary monofilaments and assembled together in a helix to form a plied yarn. The elementary monofilaments are textile, in this instance made of PET.

Figure 5:
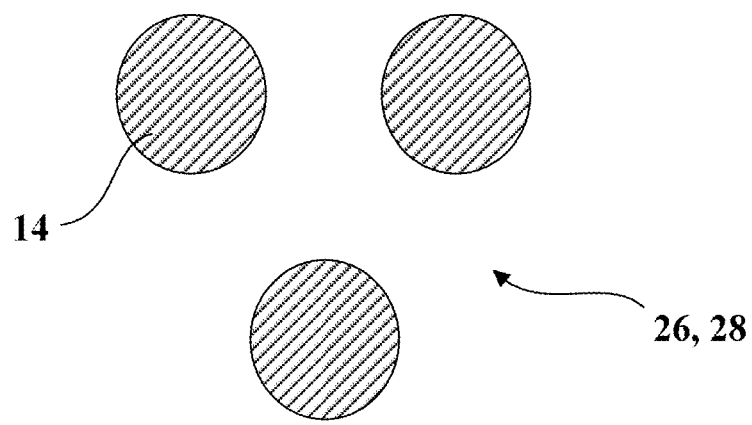
FIG. 5 is a view in section perpendicular to the axis of the assembly (assumed to be rectilinear and at rest) of an assembly according to a first embodiment of the invention, manufactured using the facility of FIG. 1.

FIG. 5 depicts each first and second assembly 26, 28 according to the first embodiment of the invention. The first assembly 26 comprises a layer of M1=3 filamentary elements 14 wound together in a helix. Likewise, the second assembly 28 comprises a layer of M2=3 filamentary elements 14 wound together in a helix. Each assembly 26, 28 has no center wire. Each first and second assembly 26, 28 is of single-helix type.

Each first and second assembly 26, 28 has a structural elongation greater than or equal to 2.0% measured in accordance with standard ASTM A931-08. Advantageously, it has a structural elongation greater than or equal to 3.0%, preferably 4.0% and more preferably 5.0%, measured in accordance with standard ASTM A931-08. In this particular instance, the structural elongation of each first and second assembly 26, 28 is equal to 5.0% measured in accordance with standard ASTM A931-08.

Each filamentary element of the layer of each first and second assembly 26, 28 exhibits torsional twist about its own axis of revolution. Each filamentary element of the layer of each first and second assembly 26, 28 has no preforming marks.

Such assemblies 26, 28 are notably used in tires and, more preferably, in the protective or hooping plies of tires as described hereinabove.

A method for manufacturing assemblies 26, 28 according to a first embodiment and implemented using the facility 10 will now be described. This method allows the assemblies 26, 28 to be manufactured simultaneously.

First of all, the filamentary elements 14 and the temporary core 16 are paid out from the feed means 12, in this instance the reels 38, 40.

The method then comprises a step of assembling the M filamentary elements 14 into a single layer of M filamentary elements around the temporary core 16. During this assembling step, the temporary assembly 22 is formed. The assembling step is performed by twisting using the twister 48, the bracket 52 and the nacelle 53.

Next, the method comprises a step of twist-balancing the temporary assembly 22, which step is performed using the twister 50.

Next, the method comprises a step of splitting the temporary assembly 22 into the first and second assemblies 26, 28. In this first embodiment, the step of splitting the temporary assembly comprises a step of separating the temporary core 16 from the first and second assemblies 26, 28. During the splitting step, the first assembly 26 is separated from a collection 25 formed by the second assembly 28 and the temporary core 16, then the second assembly 28 and the temporary core 16 are separated from one another.

On the one hand, regarding the first and second assemblies 26, 28, the method comprises a step of maintaining the rotation of the first and second assemblies 26, 28 about their respective downstream direction of travel X1, Y1. This step of maintaining downstream of the step of splitting the temporary assembly 22 is performed using the means 34.

The method also comprises a step of twist-balancing the first and second assemblies 26, 28. This final twist-balancing step is performed downstream of the intermediate twist-balancing step, using the means 35.

Finally, each first and second assembly 26, 28 is stored in the storage reels 64, 66.

On the other hand, regarding the temporary core 16, the method comprises a step of recycling the temporary core 16. During this recycling step, the temporary core 16 is recovered downstream of the splitting step and the temporary core 16 previously recovered is introduced upstream of the assembly step. This recycling step is continuous.

It will be noted that the method thus described has no steps of preforming each of the filamentary elements 14 individually.

Figure 6:
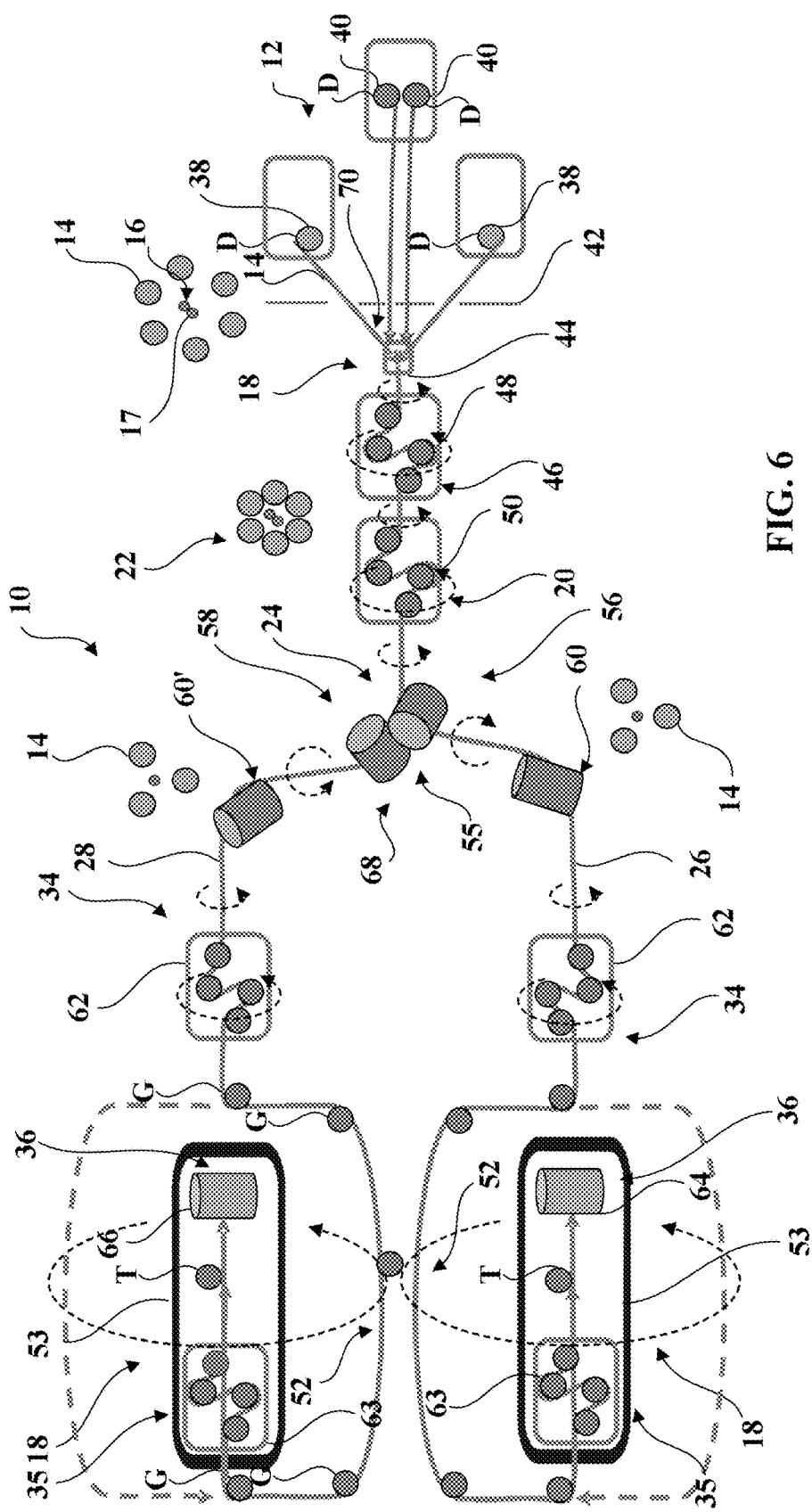
FIG. 6 is a diagram of a facility for implementing a method according to a second embodiment of the invention and manufacturing the cord of FIG. 8.
Figure 7:
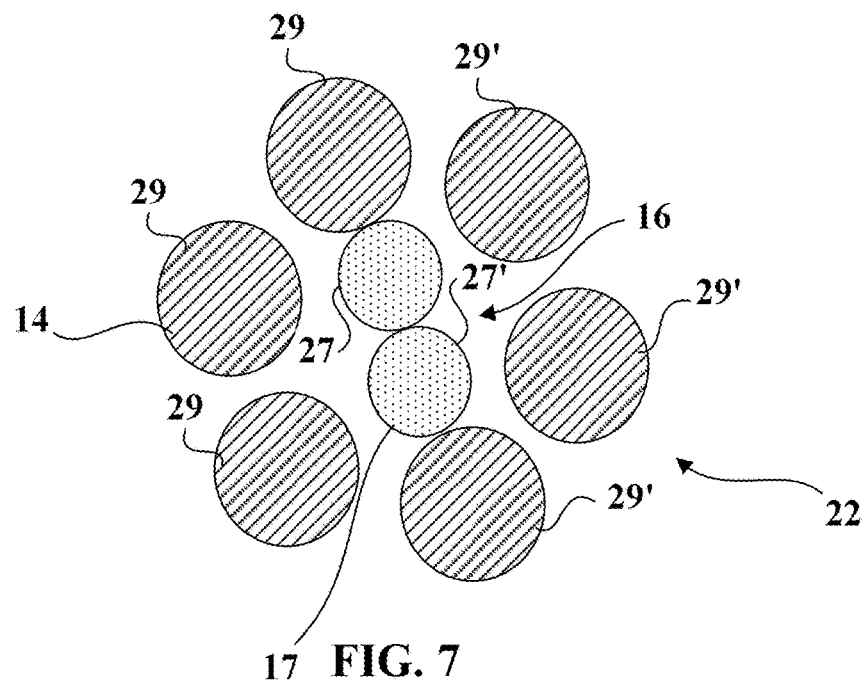
FIG. 7 is a view in section perpendicular to the axis of the assembly (assumed to be rectilinear and at rest) of a second temporary assembly.
Figure 8:
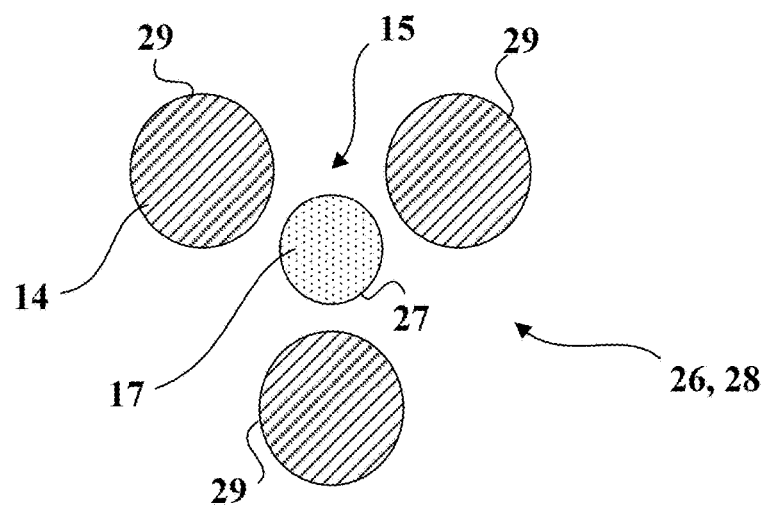
FIG. 8 is a view in section perpendicular to the axis of the assembly (assumed to be rectilinear and at rest) of an assembly according to a second embodiment of the invention, manufactured using the facility of FIG. 6.

FIGS. 6 to 8 illustrate a method and temporary assemblies and according to the invention in accordance with a second embodiment. Elements analogous to those depicted in FIGS. 1 to 5 are denoted by identical references.

Unlike in the first embodiment, the facility of FIG. 6 has no means 69 of guiding the temporary core 16 between the outlet 68 and the inlet 70. Furthermore, the splitting means 24 comprise means 55 of splitting the temporary core between at least the first and second assemblies 26, 28.

The splitting means 55 comprise means 56 of separating at least a first part 27 of the temporary core 16 with first filamentary elements 29 from the temporary assembly 22 so as to form the first assembly 26. The splitting means 55 also comprise means 58 of separating at least a second part 27' of the temporary core 16 with second filamentary elements 29' from the temporary assembly 22 so as to form the second assembly 28.

The means 56, 58 of separating the first and second assemblies from one another comprising guide means making it possible on the one hand to cause the translational movement of the first and second assemblies 26, 28 in their respective downstream directions and, on the other hand, to cause the first and second assemblies 26, 28 to rotate about their respective downstream directions. Unlike in the first embodiment, the separation means 56, 58 of the second embodiment comprise a single inclined rotary roller 61. The inclined rotary roller 61' does not separate the first and second assemblies 26, 28 from one another but only guides the second assembly 28.

Unlike in the method according to the first embodiment, the method according to the second embodiment comprises no step of recycling the temporary core 16. In this second embodiment, the step of splitting the temporary assembly comprises a step of splitting the temporary core 16, in this instance the entirety of the temporary core 16, between the first and second assemblies 26, 28.

During the splitting step, at least the first part 27 of the temporary core 16 with the first filamentary elements 29 is split from the temporary assembly 22, so as to form the first assembly 26. During the splitting step, at least the second part 27' of the temporary core 16 with the second filamentary elements 29' is also split from the temporary assembly 22, so as to form the second assembly 28. Thus, the first and second assemblies 26, 28 are formed simultaneously.

Before the splitting step, the first and second parts 27, 27' of the temporary core 16 constitute the temporary core 16.

Thus, as illustrated in FIG. 7, the temporary assembly 22 comprises a layer of M filamentary elements distributed in two parts 29, 29' and wound together in a helix around the temporary core 16 comprising N filamentary elements 17 and distributed in two parts 27, 27'. The temporary assembly 22 comprises M=6 filamentary elements 14. The temporary core 16 here comprises two filamentary elements 17 (N=2).

As illustrated in FIGS. 6 and 8, each assembly 26, 28 comprises M1=M2=4 filamentary elements comprising a layer of filamentary elements 14 wound together in a helix and a center wire 15 comprising one or more filamentary element(s) 17 of the temporary core 16 and around which the filamentary elements 14 of the layer are wound together in a helix.

In this particular instance, the first assembly 26 comprises a layer of P1 filamentary elements 14 wound together in a helix and a center wire 15 comprising, in this instance made up of, the first part 27 (N1 filamentary element(s), here N1=1) of the N filamentary element(s) 17 of the temporary core 16 and around which the first part 29 of the M filamentary elements formed by the P1 filamentary elements 14 of the layer are wound together in a helix. Here, P1+N1=M1.

The second assembly comprises a layer of P2 filamentary elements 14 wound together in a helix and a center wire 15 comprising, here consisting of, the second part 27' (N2 filamentary element(s), here N2=1) of the N filamentary element(s) 17 of the temporary core 16 and around which the second part 29' of the M filamentary elements formed by the P2 filamentary elements 14 of the layer are wound together in a helix. Here, P2+N2=M2.

Figure 9:
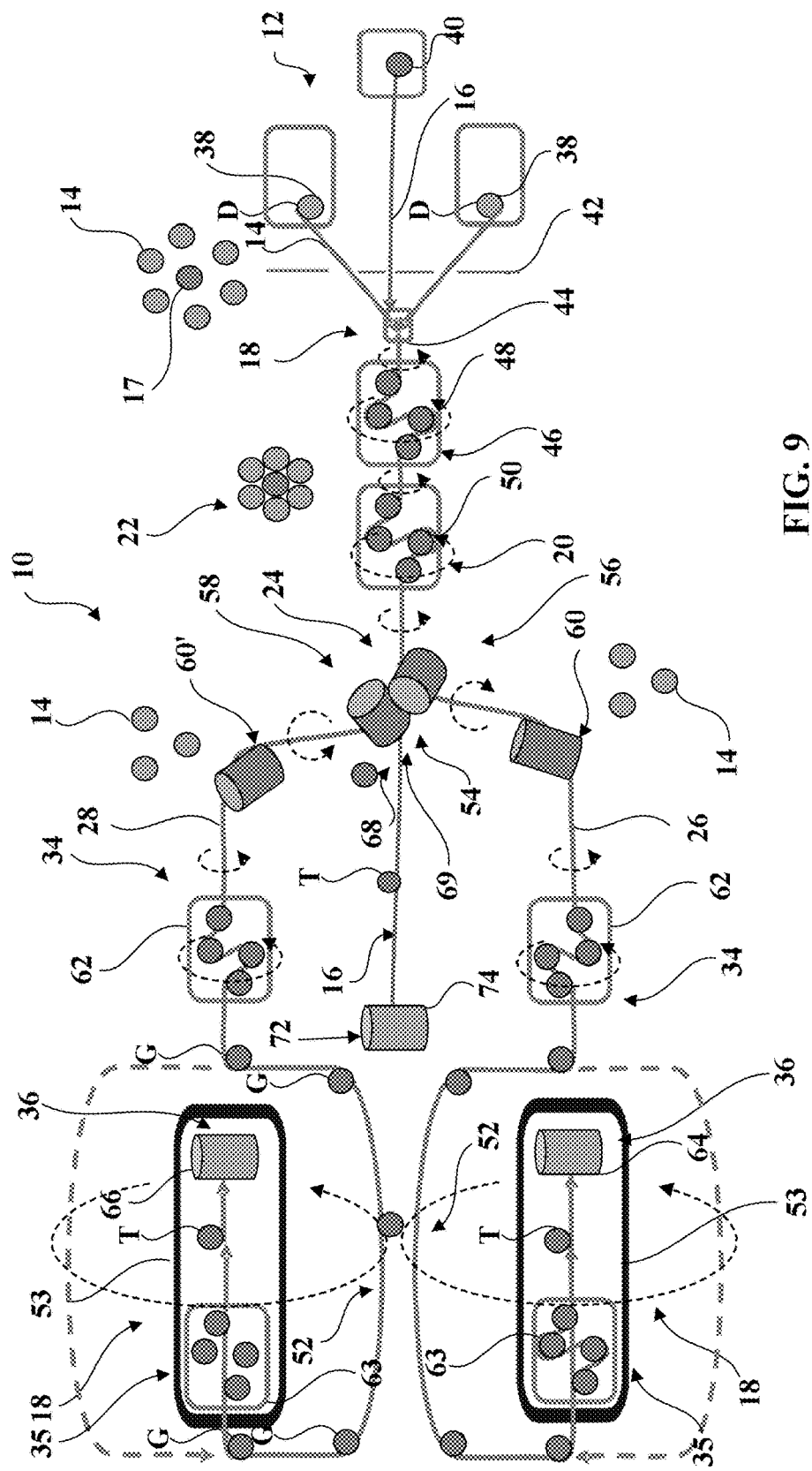
FIG. 9 is a diagram of a facility for implementing a method according to a third embodiment of the invention and manufacturing the cord of FIG. 1.

FIG. 9 illustrates a facility able to implement a method according to a third embodiment of the invention and to manufacture the cord of FIG. 1. Elements analogous to those depicted in the preceding figures are denoted by identical references.

Unlike in the first embodiment, the facility of FIG. 9 has no means 60 of guiding the temporary core 16 between the outlet 68 and the inlet 70. The facility 10 comprises means 72 of storing the temporary core 16 which are arranged downstream of the outlet 68. These means 72 comprise for example a storage reel 74. The guide means 69 of the third embodiment allow the temporary core 16 to be guided between the outlet 68 and the storage means 72.

The invention is not restricted to the embodiments described hereinabove.

Specifically, it is possible to envisage exploiting the invention with filamentary elements each comprising several metallic elementary monofilaments. Such filamentary elements, referred to as strands, are intended, once assembled, to form a multistrand rope.

It is possible to envisage, during the splitting step, separating the temporary core, the first assembly and the second assembly simultaneously from one another in pairs.

It is also possible to envisage obtaining assemblies 26, 28 of filamentary elements comprising a layer of several filamentary elements wound together in a helix around a central core comprising several filamentary elements. Such assemblies 26, 28 may then be obtained for example from temporary assemblies 22 of structure 2X+2Y, for example 4+14, 4+16, 4+18, 6+14, 6+16 or 6+18 so as to exhibit structures of the X+Y type where X>1, for example 2+7, 2+8, 2+9, 3+7, 3+8 or 3+9.

It may also be possible to envisage exploiting a method in which the assemblies 26, 28 do not necessarily have the same structure. Thus, assemblies 26, 28 with respective structures X+Y, Z+T where X≠Z and/or Y≠T, may be obtained from a temporary assembly 22 of structure (X+Z)+(Y+T). For example, a temporary assembly 22 of structure 3+15 makes it possible to obtain two assemblies of structures 1+8 and 2+7.

It might also be possible to envisage splitting the temporary assembly into more than two assemblies, for example into 3 or 4.

The invention claimed is:

1. A method for manufacturing at least first and second assemblies of M1 filamentary elements and M2 filamentary elements, respectively, at least one of the first and second assemblies including a plurality of filamentary elements wound together in a helix, the method comprising steps of:
assembling M filamentary elements together into a layer of the M filamentary elements around a temporary core, to form a temporary assembly; and
splitting the temporary assembly into at least the first and second assemblies of M1 filamentary elements and M2 filamentary elements, respectively,
wherein during the step of splitting the temporary assembly, the first assembly is separated from a temporary collection formed of the second assembly and the temporary core, and then the second assembly and the temporary core are separated from each other.

2. The method according to claim 1, further comprising a step of recycling the temporary core,
wherein, during the step of recycling:
(a) the temporary core is recovered downstream of the step of splitting the temporary assembly, and
(b) the temporary core, after being recovered, is introduced upstream of the step of assembling the M filamentary elements.

3. A method for manufacturing at least first and second assemblies of M1 filamentary elements and M2 filamentary elements, respectively, at least one of the first and second assemblies including a plurality of filamentary elements wound together in a helix, the method comprising steps of:
assembling M filamentary elements together into a layer of the M filamentary elements around a temporary core, to form a temporary assembly; and
splitting the temporary assembly into at least the first and second assemblies of M1 filamentary elements and M2 filamentary elements, respectively,
wherein the step of splitting the temporary assembly includes splitting the temporary core between at least the first and second assemblies, and
wherein, during the step of splitting the temporary assembly, (1) at least a first part of the temporary core with first filamentary elements is split from the temporary assembly so as to form the first assembly, and (2) at least a second part of the temporary core with second filamentary elements is split from the temporary assembly so as to form the second assembly.

4. The method according to claim 3, wherein, before the step of splitting the temporary assembly, the temporary core includes the first and second parts.

5. The method according to claim 1, wherein, in the step of assembling the M filamentary elements, twisting is performed.

6. The method according to claim 1, further comprising a step of twist-balancing the temporary assembly.

7. The method according to claim 1, wherein no step of individually preforming each of the M filamentary elements is included in the method.

8. A single-helix assembly comprising a layer formed of a plurality of filamentary elements wound together in a helix,
wherein the assembly has a structural elongation greater than or equal to 2.0% measured in accordance with a standard described in ASTM A931-08,
wherein the assembly is obtained according to a method for manufacturing at least first and second assemblies of M1 filamentary elements and M2 filamentary elements, respectively, at least one of the first and second assemblies including a plurality of filamentary elements wound together in a helix, the method including steps of:
(a) assembling M filamentary elements together into a layer of the M filamentary elements around a temporary core, to form a temporary assembly, and
(b) splitting the temporary assembly into at least the first and second assemblies of M1 filamentary elements and M2 filamentary elements, respectively,
wherein during the step of splitting the temporary assembly, the temporary core, the first assembly, and the second assembly are separated such that each of the first assembly and the second assembly have an open-cord construction with no center element.

9. The assembly according to claim 8, wherein each filamentary element of the layer exhibits torsion about an axis of revolution of the filament.

10. The assembly according to claim 8, wherein each filamentary element of the layer exhibits no preforming marks.

11. A tire comprising an assembly of filamentary elements, the assembly being the single-helix assembly according to claim 8.

12. The method according to claim 3, wherein, in the step of assembling the M filamentary elements, twisting is performed.

13. The method according to claim 3, further comprising a step of twist-balancing the temporary assembly.

14. The method according to claim 3, wherein no step of individually preforming each of the M filamentary elements is included in the method.

15. A single-helix assembly comprising a layer formed of a plurality of filamentary elements wound together in a helix,
wherein the assembly has a structural elongation greater than or equal to 2.0% measured in accordance with a standard described in ASTM A931-08,
wherein the assembly is obtained according to a method for manufacturing at least first and second assemblies of M1 filamentary elements and M2 filamentary elements, respectively, at least one of the first and second assemblies including a plurality of filamentary elements wound together in a helix, the method including steps of:
(a) assembling M filamentary elements together into a layer of the M filamentary elements around a temporary core, to form a temporary assembly, and
(b) splitting the temporary assembly into at least the first and second assemblies of M1 filamentary elements and M2 filamentary elements, respectively,
wherein during the step of splitting the temporary assembly, the temporary core is split between at least the first and second assemblies such that the first assembly includes a first part of the temporary core with first filamentary elements and the second assembly includes a second part of the temporary core with second filamentary elements.

16. A tire comprising an assembly of filamentary elements, the assembly being the single-helix assembly according to claim 15.

* * * * *